United States Patent
Takada

(10) Patent No.: US 11,205,959 B2
(45) Date of Patent: Dec. 21, 2021

(54) SWITCHING REGULATOR INCLUDING PFM DETECTOR

(71) Applicant: ABLIC Inc., Chiba (JP)

(72) Inventor: Kosuke Takada, Chiba (JP)

(73) Assignee: ABLIC INC., Chiba (JP)

( * ) Notice: Subject to any disclaimer, the term of this patent is extended or adjusted under 35 U.S.C. 154(b) by 0 days.

(21) Appl. No.: 16/596,325

(22) Filed: Oct. 8, 2019

(65) Prior Publication Data

US 2020/0127561 A1 Apr. 23, 2020

(30) Foreign Application Priority Data

Oct. 18, 2018 (JP) .............................. JP2018-196767

(51) Int. Cl.
*H02M 3/156* (2006.01)
*H02M 1/00* (2006.01)

(52) U.S. Cl.
CPC .......... *H02M 3/156* (2013.01); *H02M 1/0009* (2021.05)

(58) Field of Classification Search
CPC ....................... H02M 3/156; H02M 2001/0009
USPC ........................................................ 323/282
See application file for complete search history.

(56) References Cited

U.S. PATENT DOCUMENTS

| 2011/0133711 A1* | 6/2011 | Murakami | ......... H03K 17/0822 323/282 |
| 2015/0194880 A1* | 7/2015 | Wibben | ................ H02M 3/156 323/282 |

FOREIGN PATENT DOCUMENTS

JP 2003-219637 7/2003

* cited by examiner

*Primary Examiner* — Shawki S Ismail
*Assistant Examiner* — Monica Mata
(74) *Attorney, Agent, or Firm* — Crowell & Moring LLP

(57) ABSTRACT

A switching regulator has an error amplifier supplying an error current, a phase compensation portion generating an error voltage, a clamper clamping the error voltage, a PFM detector supplying a comparison result signal of a first level or a comparison result signal of a second level based on the error current, an oscillator supplying a clock signal in response to the comparison result signal at the second level and fixing the clock signal in response to the comparison result signal at the first level, and a PWM converter turning on/off a switching element with a desired pulse width based on the error voltage and the output from the oscillator.

4 Claims, 5 Drawing Sheets

SWITCHING REGULATOR INCLUDING PFM DETECTOR

RELATED APPLICATIONS

This application claims priority to Japanese Patent Application No. 2018-196767, filed on Oct. 18, 2018, the entire content of which is incorporated herein by reference.

BACKGROUND OF THE INVENTION

1. Field of the Invention

The present invention relates to a switching regulator.

2. Background Art

FIG. 4 illustrates a circuit diagram of a conventional switching regulator 500 in prior art.

The conventional switching regulator 500 has a power supply terminal 501, a ground terminal 502, a reference voltage source 510, an error amplifier 511, a reference voltage source 512, a PFM comparator 513, an oscillator 514, a PMOS transistor 530, an NMOS transistor 531, an inductor 540, a capacitor 541, resistors 543 and 544, an output terminal 542, a PWM converter 550 containing a current-voltage converter 520, a slope voltage generator 521, a PWM comparator 522, a controller 523, and a reverse current detector 524, and a phase compensation circuit 560 containing a capacitor 561 and a resistor 562 and is constituted by connecting them as illustrated in FIG. 4 (for example, see Japanese Patent Application Laid-Open No. 2003-219637). PFM and PWM stand for Pulse Frequency Modulation and Pulse Width Modulation, respectively.

The error amplifier 511 compares a voltage VFB obtained by dividing the voltage VOUT at the output terminal 542 by the resistor 543 and the resistor 544 with a reference voltage VREF1 of the reference voltage source 510, and then outputs an error voltage VERR.

The current-voltage converter 520 converts a source current of the PMOS transistor 530 into a voltage, and then outputs the voltage to the slope voltage generator 521. The slope voltage generator 521 adds a sawtooth wave to the output from the current-voltage converter 520, and then outputs a voltage VCS. The PWM comparator 522 compares the error voltage VERR with the voltage VCS, and then outputs a comparison result signal CMPW to the controller 523.

The PFM comparator 513 compares a reference voltage VREF2 of the reference voltage source 512 with the error voltage VERR, and then outputs a comparison result signal CMPF to the oscillator 514. When the comparison result signal CMPF is at low level, the oscillator 514 oscillates at a predetermined frequency, and then outputs a clock signal as an output signal CLK. When the comparison result signal CMPF is at high level, the oscillator 514 stops the oscillation, and then fixes the output signal CLK to low level.

The reverse current detector 524 compares a drain voltage of the NMOS transistor 531 with a source voltage thereof. The drain voltage becomes higher than the source voltage, the reverse current detector 524 then outputs a reverse current detection signal to the controller 523. The controller 523 controls the on/off of the PMOS transistor 530 and the NMOS transistor 531 according to each received signal. The inductor 540 and the capacitor 541 smooth a voltage VSW supplied from the drain of the PMOS transistor 530.

A negative feedback loop is functioned by such a configuration, so that the switching regulator 500 operates in such a manner that the voltage VFB is equal to the reference voltage VREF1, and then generates the voltage VOUT to the output terminal 542. Although not illustrated in Japanese Patent Application Laid-Open No. 2003-219637, the phase compensation circuit 560 is generally connected to the output from the error amplifier 511 as illustrated in FIG. 4, suppressing the oscillation of the negative feedback loop.

In the switching regulator 500, a PWM operation and a PFM operation are switched as shown below depending on the magnitude of the current flowing through the load (load current) connected to the output terminal 542.

At a large load current, the error voltage VERR increases in such a manner as to compensate a reduction in the output voltage VOUT. Hence, the error voltage VERR becomes steadily larger than the reference voltage VREF2 and the oscillator 514 continuously supplies a clock signal of the predetermined frequency as the output signal CLK. The PWM converter 550 turns on the PMOS transistor 530 and turns off the NMOS transistor 531 synchronizing with the rise of the clock signal.

At this time, the pulse width of the signal controlling the on time of the PMOS transistor 530 is determined by the PWM converter 550. Hence, the switching regulator 500 performs the PWM operation under the large load current.

Thereafter, at the onset of a decrease of the load current, the above-described state where the error voltage VERR is steadily larger than the reference voltage VREF2 continues at the timing immediately after the load current decreases. However, since the amount of the lowering of the voltage VOUT is small after the load current becomes small, an increase in the output voltage VOUT by turning-on of the PMOS transistor 530 becomes large. The error voltage VERR hence decreases in such a manner as to compensate the increase in the output voltage VOUT to reach a voltage smaller than the reference voltage VREF2. Accordingly, the PMOS transistor 530 turns off and the output voltage VOUT decreases.

Then, the error voltage VERR increases and becomes larger than the reference voltage VREF2, the oscillator 514 outputs a clock signal as the output signal CLK. The PWM converter 550 turns on the PMOS transistor 530 and turns off the NMOS transistor 531, synchronizing with the rise of the clock signal. At this time, since the load current is small, the output voltage VOUT immediately exceeds a desired voltage by the turning on of the PMOS transistor 530, and the error voltage VERR decreases. Then, the PWM converter 550 turns off the PMOS transistor 530 and turns on the NMOS transistor 531. The oscillator 514 stops and fixes the output signal CLK to low level. As described above, at a small load current, the oscillator 514 repeats the oscillation and the stop. More specifically, the switching regulator 500 performs the PFM operation.

As described above, adoption of the scheme of switching the PWM operation and the PFM operation by comparing the error voltage VERR with the reference voltage VREF2 enables the conventional switching regulator 500 to shift to the PFM operation under the small load current to improve the power conversion efficiency.

However, in the above-described conventional switching regulator 500, the switching operation of the PMOS transistor 530 consecutively occurs several times in the PFM operation, increasing the ripple voltage of the output voltage VOUT in some cases.

This is because the wave form of the error voltage VERR which is an output signal from the error amplifier 511 is made blunt by the capacitor 561 and the resistor 562 forming the phase compensation circuit 560 so that the timing the oscillator 514 is disabled delays and a plurality of clock signals is supplied to the output from the oscillator 514.

FIG. 5 illustrates each waveform of an inductor current IL flowing into the inductor 540, the output voltage VOUT, the voltage VFB, the error voltage VERR, the comparison result signal CMPF, and the output signal CLK of the oscillator 514 in the conventional switching regulator 500.

At time t0, the comparison result signal CMPF is at high level and the PMOS transistor 530 stops the switching operation. The voltage VFB decreases with the reduction in the output voltage VOUT and the voltage VFB is lower than the reference voltage VREF1, the error voltage VERR then increases.

At time t1, the error voltage VERR exceeds the reference voltage VREF2 and the comparison result signal CMPF is switched to low level, then the output signal CLK is supplied by a clock signal, the PMOS transistor 530 is turned on, and the inductor current IL flows, thereby increasing the output voltage VOUT.

At time t2, the output voltage VOUT exceeds a desired voltage VTG, i.e., the voltage VFB exceeds the reference voltage VREF1, then the error voltage VERR begins to decrease.

Lastly, at time t3, the error voltage VERR becomes lower than the reference voltage VREF2, then the comparison result signal CMPF is switched to high level. Herein, since the phase compensation circuit 560 is connected to the output from the error amplifier 511 as described above, the error voltage VERR is an integration of the output current from the error amplifier 511 by the capacitor 561. Hence, the signal becomes blunt so that the error voltage VERR gently decreases from time t2.

It takes a relatively long time Pb from the time t2 when the error voltage VERR begins to decrease (i.e., after the direction of the change of the error voltage VERR is switched) to the time t3 when the error voltage VERR becomes lower than the reference voltage VREF2 (i.e., the error voltage VERR crosses the reference voltage VREF2). As a result, an excessive clock signal is supplied as the output signal CLK between time t2 and time t3, so that the PMOS transistor 530 performs excessive switching operation. Hence, the ripple voltage of the output voltage VOUT increases.

SUMMARY OF THE INVENTION

It is an object of the present invention to provide a switching regulator capable of reducing the ripple voltage of the output voltage in the PFM operation.

A switching regulator according to one embodiment of the present invention includes an inductor one end of which is connected to an output terminal, a switching element connected between the first power supply terminal and the other end of the inductor, an error amplifier configured to amplify a difference between a voltage based on an output voltage and a reference voltage and supply an error current, a phase compensation portion configured to receive the error current and generate an error voltage, a clamper configured to clamp the error voltage in such a manner that the error voltage is more than the predetermined voltage, a PFM detector configured to output a comparison result signal of a first level in response to the error current having a predetermined polarity under a clamp operation of the clamper, and to otherwise output a comparison result signal of a second level, an oscillator configured to output a clock signal of a predetermined frequency in response to the comparison result signal at the second level and fix the clock signal at a predetermined level in response to the comparison result signal at the first level, and a PWM converter configured to turn on/off the switching element with a desired pulse width based on the error voltage and an output form the oscillator.

The switching regulator of the present invention has a clamper which clamps the error voltage and a PFM detector which performs the PFM detection by the clamp operation and the polarity of the error current, whereby suppression of excessive switching operation in the PFM operation is permitted. Hence, the ripple voltage of the voltage VOUT in the PFM operation can be reduced.

DETAILED DESCRIPTION OF THE PREFERRED EMBODIMENTS

Hereinafter, embodiments of the present invention are described with reference to the drawings.

Figure 1:
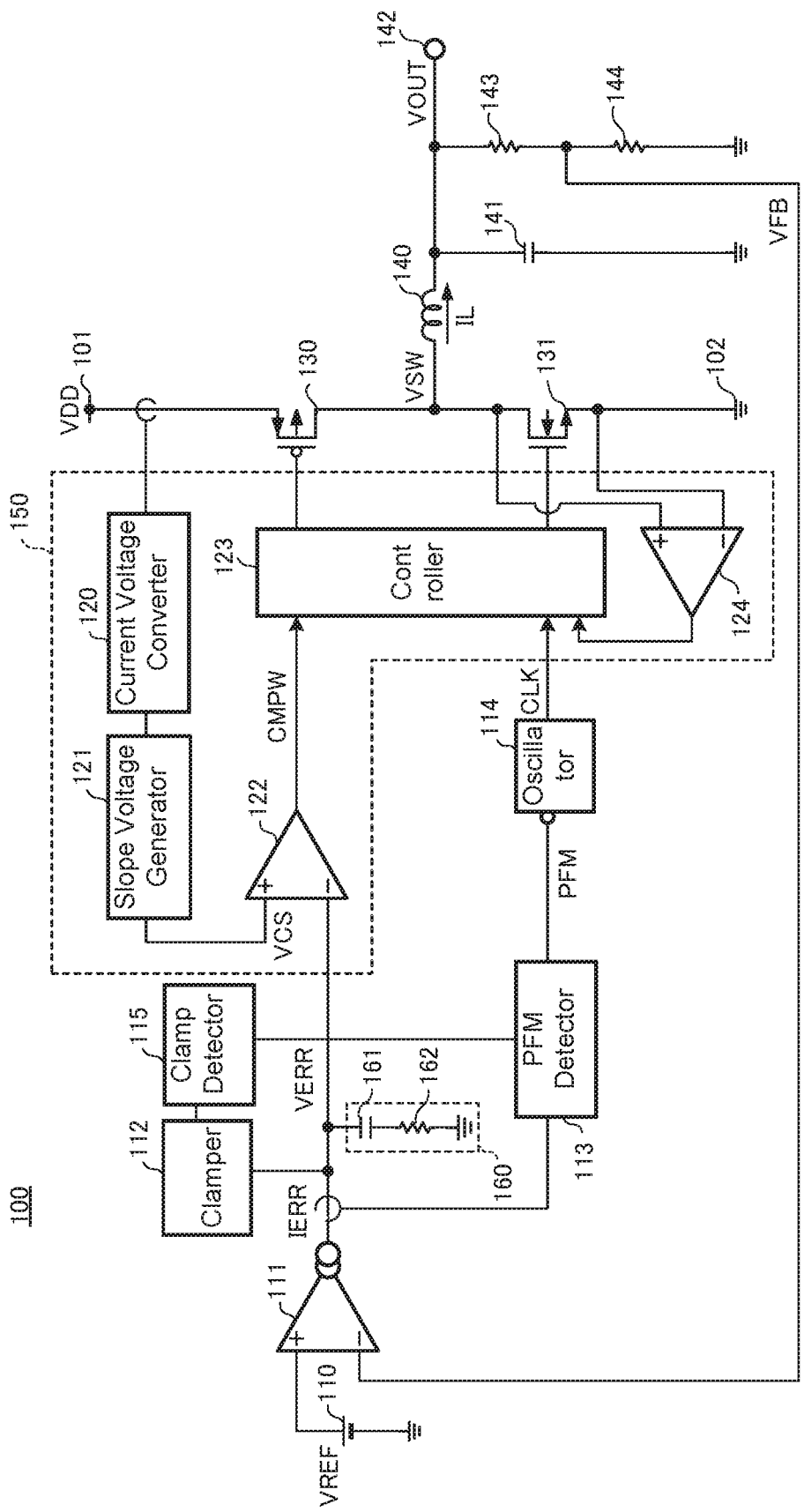
FIG. 1 is a circuit diagram illustrating a switching regulator according to an embodiment of the present invention.

FIG. 1 is a circuit diagram of a switching regulator 100 according to the embodiments of the present invention.

The switching regulator 100 has a power supply terminal 101, a ground terminal 102, a reference voltage source 110, an error amplifier 111, a clamper 112, a PFM detector 113, an oscillator 114, a clamp detector 115, a PMOS transistor 130 and an NMOS transistor 131 which are switching elements, an inductor 140, a capacitor 141, a resistor 143, a resistor 144, an output terminal 142, a PWM converter 150, and a phase compensation portion 160. The PWM converter 150 has a current-voltage converter 120, a slope voltage generator 121, a PWM comparator 122, a controller 123, and a reverse current detector 124. The phase compensation portion 160 contains a capacitor 161 and a resistor 162, for example.

In the reference voltage source 110, one end is connected to a non-inverted input terminal of the error amplifier 111 and the other end is connected to the ground terminal 102. In the error amplifier 111, an inverted input terminal is connected to one end of the resistor 143 and one end of the resistor 144 and an output is connected to a first output from the clamper 112, one end of the phase compensation portion 160, an inverted input terminal of the PWM comparator 122, and a first input to the PFM detector 113. In the clamp detector 115, an input is connected to a second output from the clamper 112 and an output is connected to a second input to the PFM detector 113.

In the oscillator 114, an input is connected to the output from the PFM detector 113 and an output is connected to an input to the controller 123. In the slope voltage generator 121, an input is connected to an output from the current-voltage converter 120 and an output is connected to a non-inverted input terminal of the PWM comparator 122. In the PWM comparator 122, an output is connected to an input to the controller 123. In the PMOS transistor 130, a source is connected to the power supply terminal 101 and an input to the current-voltage converter 120, a gate is connected to an output from the controller 123, and a drain is connected to one end of the inductor 140, a non-inverted input terminal of the reverse current detector 124, and a drain of the NMOS transistor 131. In the NMOS transistor 131, a gate is connected to an output from the controller 123 and a source is connected to the ground terminal 102.

In the reverse current detector 124, an inverted input terminal is connected to the ground terminal 102 and an output is connected to an input to the controller 123. In the inductor 140, the other end is connected to one end of the capacitor 141, the other end of the resistor 143, and the output terminal 142. The other end of the capacitor 141 is connected to the ground terminal 102. The other end of the resistor 144 is connected to the ground terminal 102. The capacitor 161 and the resistor 162 are connected in series between the output from the error amplifier 111 and the ground terminal 102.

Next, the operation of the switching regulator 100 having a configuration as described above is described.

The error amplifier 111 compares the voltage VFB obtained by dividing the voltage VOUT of the output terminal 142 by the resistor 143 and the resistor 144 with the voltage VREF of the reference voltage source 110, and then outputs a current IERR. The polarity of the current IERR is defined to be positive when the current IERR flows from the error amplifier 111. The phase compensation portion 160 receives the current IERR and generates a voltage VERR The current-voltage converter 120 converts the source current of the PMOS transistor 130 into a voltage, and then inputs the voltage into the slope voltage generator 121. The slope voltage generator 121 adds a sawtooth wave to the output from the current-voltage converter 120, and then outputs a voltage VCS. The PWM comparator 122 compares the voltage VERR with the voltage VCS, and then outputs a comparison result signal CMPW to the controller 123.

The clamper 112 clamps the voltage VERR in such a manner that the voltage VERR is more than the predetermined voltage. The clamp detector 115 detects the operation of the clamper 112, and then outputs a high-level signal for the clamp operation and otherwise outputs a low-level signal. The clamp detector 115 detects the clamp operation by a current of the clamper 112, for example.

The PFM detector 113 sets a signal PFM to high level in response to a receiving of a high-level signal from the clamp detector 115 and a detection that the polarity of the current IERR is negative, and otherwise sets the signal PFM to low level.

The oscillator 114 oscillates and outputs (enables) a clock signal which is an output signal CLK of a predetermined frequency from the output in response to the signal PFM at low level, and stops oscillation and fixes (disables) the output signal CLK to low level in response to the signal PFM at high level. The reverse current detector 124 compares the drain voltage of the NMOS transistor 131 with the source voltage thereof, and then outputs a reverse current detection signal to the controller 123 based on the result that the drain voltage is higher than source voltage.

The controller 123 controls the on/off of the PMOS transistor 130 and the NMOS transistor 131 according to each supplied signal. The inductor 140 and the capacitor 141 smooth a voltage VSW supplied from the connecting point of the PMOS transistor 130 and the NMOS transistor 131.

A negative feedback loop is functioned by such a circuit configuration and the switching regulator 100 operates in such a manner that the voltage VFB is equal to the reference voltage VREF, and then generates the voltage VOUT to the output terminal 142.

In the switching regulator 100, the PWM operation and the PFM operation are switched as explained below depending on the magnitude of the current (load current) flowing into the load (not illustrated) connected to the output terminal 142.

Since at a large load current the voltage VERR increases in such a manner as to compensate a reduction in the output voltage VOUT, the clamper 112 does not perform the clamp operation. Hence, the clamp detector 115 outputs a low-level signal, and the oscillator 114 is enabled by the PFM detector 113. At this time, the pulse width of the voltage VSW is determined in the PWM converter 150 and the switching regulator 100 performs the PWM operation.

Since at a small load current the voltage VERR decreases equal to or lower than the clamp voltage of the clamper 112, the clamper 112 performs the clamp operation. Hence, the clamp detector 115 outputs a high-level signal to the PFM detector 113. By the further detection that the polarity of the current IERR is negative, the PFM detector 113 disables the oscillator 114.

Hence, the PMOS transistor 130 turns off, and the charges in the capacitor 141 are continuously discharged by the load current, decreasing the output voltage VOUT. Since the error amplifier 111 accordingly outputs the current IERR of positive polarity, the oscillator 114 is enabled by the PFM detector 113. As described above, at a small load current, the oscillator 114 repeats the oscillation and the stop. More specifically, the switching regulator 100 performs the PFM operation.

The switching regulator 100 according to the first embodiment of the present invention can shift to the PFM operation under a small load current in this way to improve the power conversion efficiency.

Figure 2:
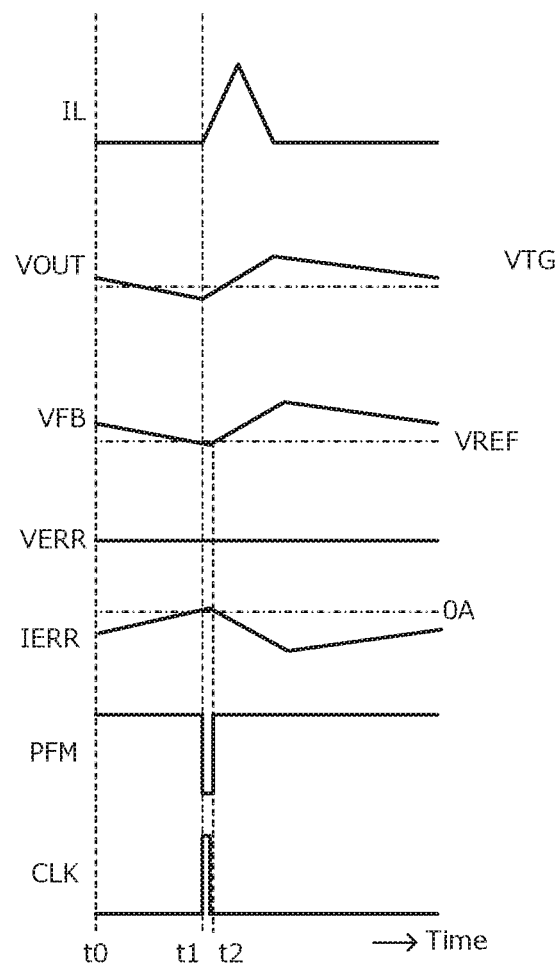
FIG. 2 is a view illustrating the waveform of each node of the switching regulator of FIG. 1.

FIG. 2 illustrates respectively each waveform of an inductor current IL, the output voltage VOUT, the voltage VFB, the voltage VERR, the current IERR, the comparison result signal PFM, and the output signal CLK of the switching regulator 100 according to the embodiment. FIG. 2 illustrates the state where the clamper 112 performs the clamp operation so that the voltage VERR is a clamp voltage.

At time t0, the signal PFM is at high level and the PMOS transistor 130 stops the switching operation and turns off. Since the PMOS transistor 130 turns off, the output voltage VOUT decreases and the voltage VFB decreases accordingly. Since the voltage VFB decreases, the current IERR supplied by the error amplifier 111 increases.

At time t1, the voltage VFB becomes lower than the voltage VREF, then the signal PFM inverts to low level since the polarity of the current IERR becomes positive. The signal PFM becomes low level, then the output signal CLK is supplied, so that the switching operation of the PMOS transistor 130 and the NMOS transistor 131 starts. The inductor current IL thereby flows, increasing the voltage VOUT and the voltage VFB.

At time t2, the signal PFM becomes high level since the voltage VFB becomes larger than the voltage VREF, the polarity of the current IERR then becomes negative, and the clamper 112 performs the clamp operation.

As described above, according to the embodiment, the PFM comparator 113 can set the signal PFM to high level in shorter delay time than before by receiving the signal of the clamp detector 115 and detecting the polarity of the current IERR. More specifically, supply of an excessive clock signal can be suppressed to the output signal CLK after the clock signal is supplied as the output signal CLK from the oscillator 114 at the time t1. Hence, the PMOS transistor 130 does not excessively perform the switching operation, and an increase in the ripple voltage of the output voltage VOUT can thus be suppressed.

Figure 3:
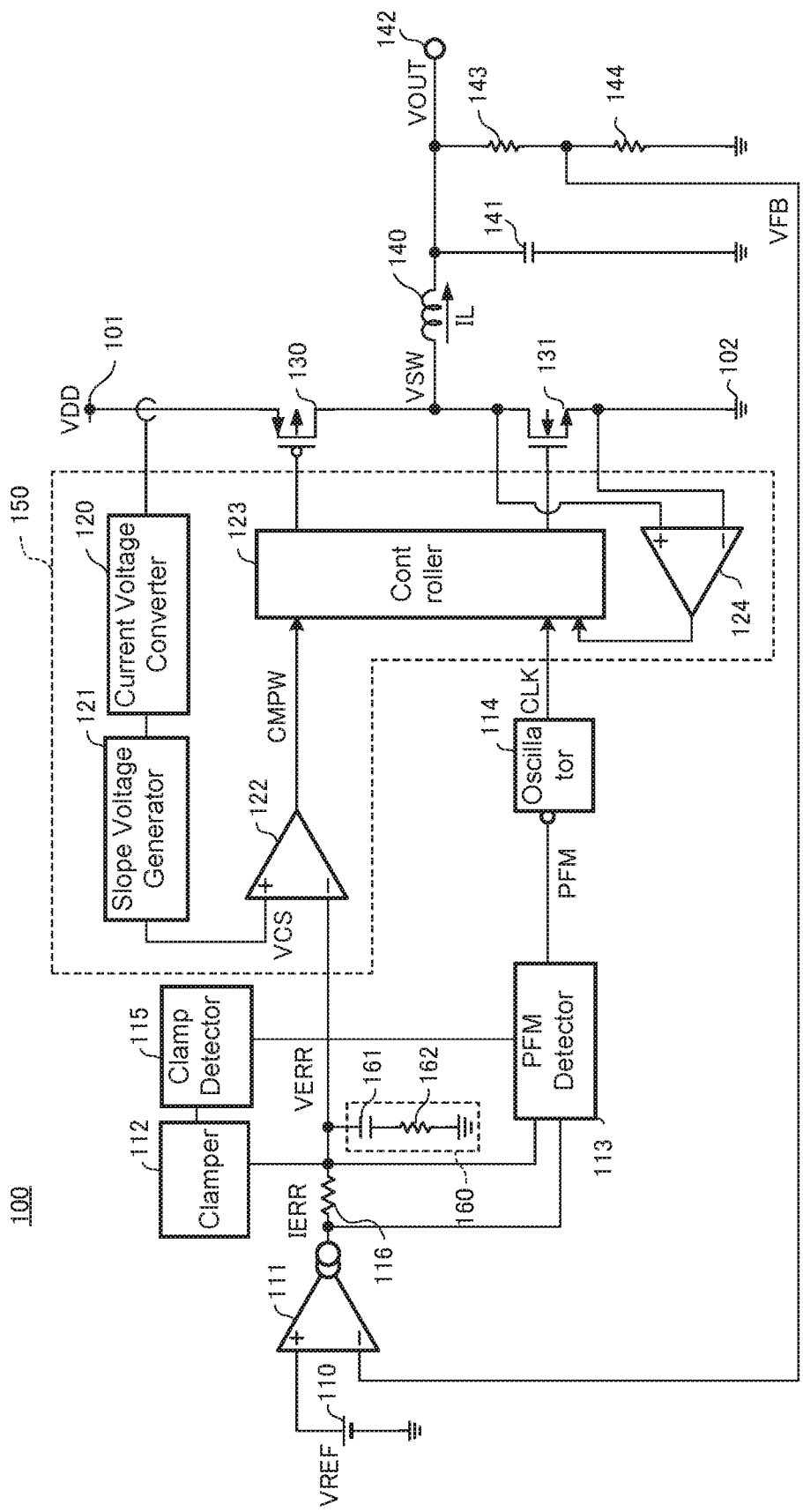
FIG. 3 is a circuit diagram illustrating another example of the switching regulator according to the embodiment of the present invention.
Figure 4:
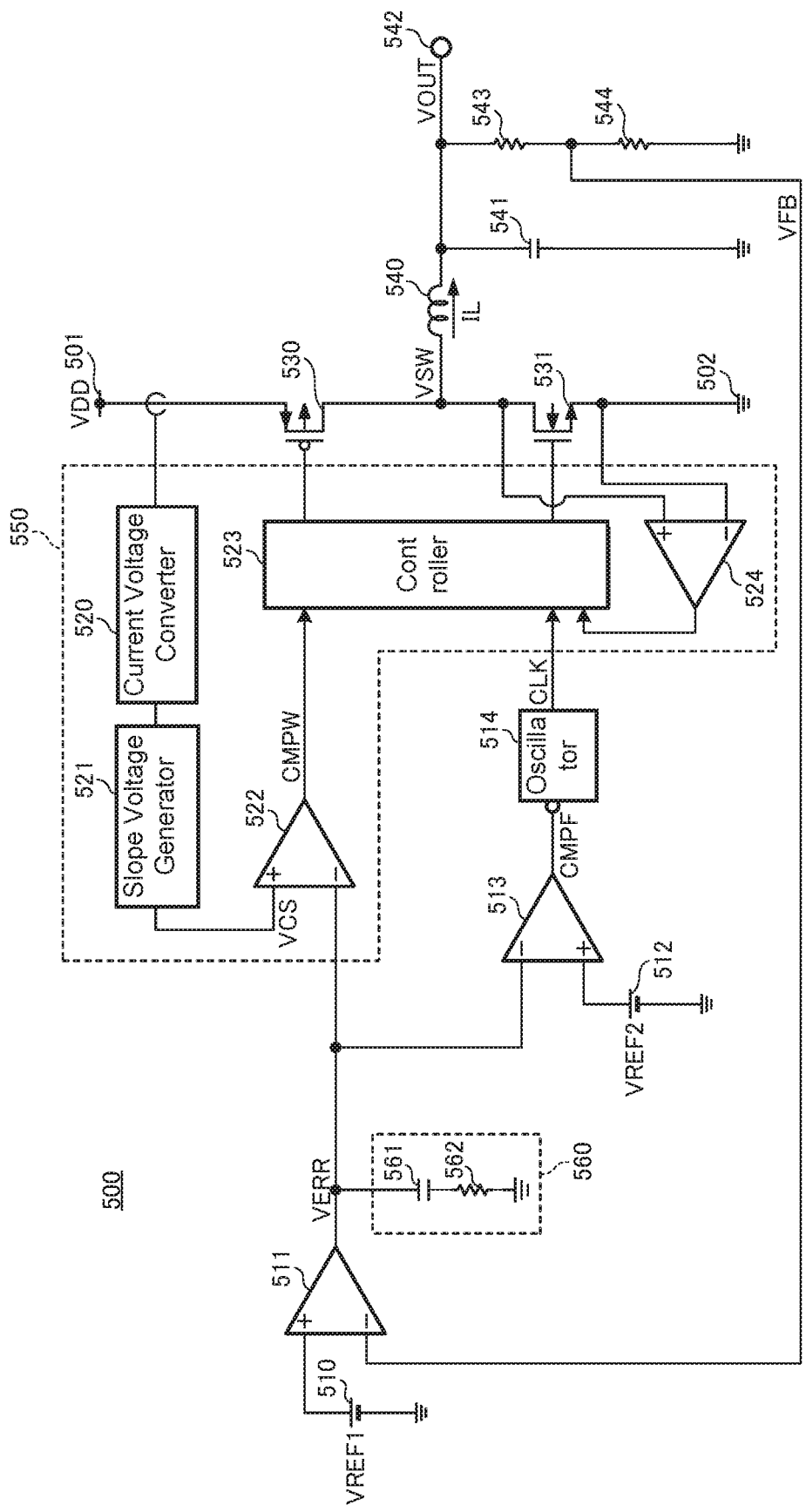
FIG. 4 is a circuit diagram illustrating a conventional switching regulator in prior art.
Figure 5:
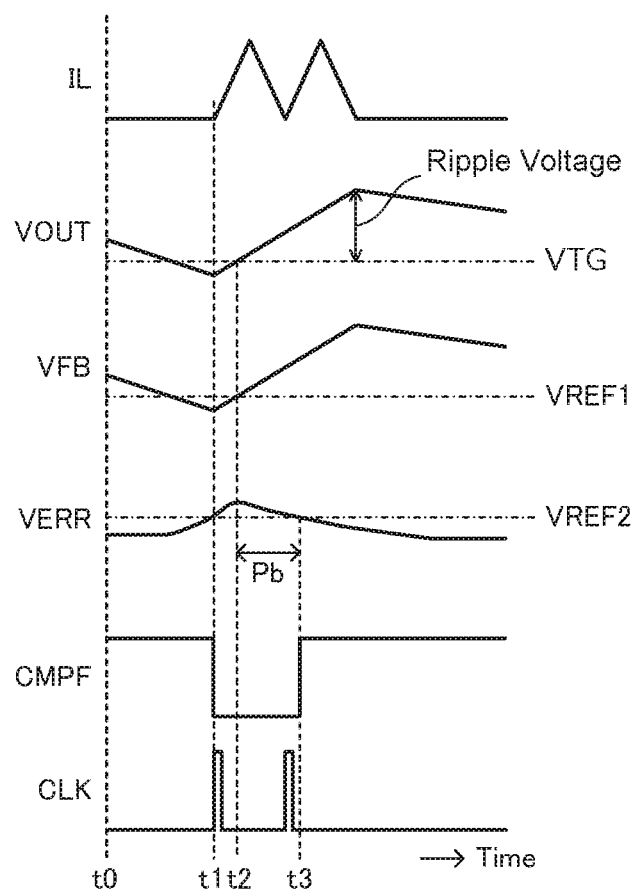
FIG. 5 is a view illustrating waveforms at each node of the switching regulator illustrated in FIG. 4

Next, another example of the switching regulator according to the embodiment is described with reference to FIG. 3.

In this example, a method for detecting the polarity of the current IERR supplied from the error amplifier 111 by the PFM detector 113 is changed from the detection in the circuit of FIG. 1. In detail, a resistor 116 is provided between the output from the error amplifier 111 and the inverted input terminal of the PWM comparator 122.

One end of the resistor 116 is connected to the output from the error amplifier 111 and the first input of the PFM detector 113 and the other end is connected to an input of the clamper 112, the one end of the phase compensation portion 160, the inverted input terminal of the PWM comparator 122, and the second input of the PFM detector 113. Since the other configurations are the same as those in FIG. 1, the same reference numerals are given to the same constituent components and a redundant description is omitted as appropriate.

The current IERR is converted into a voltage by the resistor 116. The PFM detector 113 detects the polarity of the supplied current IERR by a voltage between both ends of the resistor 116. The operations of the other elements are the same as those in the circuit of FIG. 1.

As described above, even though the polarity of the current IERR is detected by the voltage converted by the resistor 116, the signal PFM can be similarly set to a high level in shorter delay time than before. Hence, the ripple voltage of the voltage VOUT can be suppressed.

As described above, although the embodiments of the present invention are described, the present invention is not limited to the embodiments described above and can be variously altered without deviating from the gist of the present invention.

For example, in the embodiments described above, although the description is given in the configuration having the clamp detector 115, a configuration may be acceptable in which the PFM detector 113 detects the clamp operation. Moreover, although the embodiments described above describe the example of using the MOS transistor as the switching regulator, a bipolar transistor and the like may be used. Moreover, the embodiments described above can also use a circuit configuration in which the polarities of the PMOS transistor and the NMOS transistor are reversed

What is claimed is:

1. A switching regulator generating a predetermined output voltage at an output terminal from a power supply voltage supplied to a first power supply terminal, the switching regulator comprising:
   an inductor having one end connected to the output terminal;
   a switching element connected between the first power supply terminal and another end of the inductor;
   an error amplifier configured to amplify a difference between a voltage based on the predetermined output voltage and a reference voltage and supply an error current;
   a phase compensation portion configured to receive the error current and generate an error voltage;
   a clamper configured to clamp the error voltage in such a manner that the error voltage is more than a predetermined voltage;
   a PFM detector configured to:
      determine whether the error current has a predetermined polarity;
      output a comparison result signal having a first level in response to determining that the error current has the predetermined polarity and in response to receiving a clamp detection signal indicating the clamper is presently clamping the error voltage, wherein the clamp detection signal is a different signal from the error voltage and the error current; and
      output the comparison result signal having a second level in response to at least one of determining that the error current does not have the predetermined polarity or not receiving the clamp detection signal indicating the clamper is presently clamping the error voltage;
   an oscillator configured to:
      receive the comparison result signal from the PFM detector;
      output an oscillating clock signal of a predetermined frequency in direct response to the comparison result signal received by the oscillator being at the second level; and
      stop outputting the oscillating clock signal in direct response to the comparison result signal received by the oscillator being at the first level; and
   a PWM converter configured to turn on/off the switching element with a desired pulse width based on the error voltage and an output from the oscillator.

2. The switching regulator according to claim 1, further comprising:
   a resistor between an output from the error amplifier and the phase compensation portion, wherein
   the PFM detector detects a polarity of the error current by a voltage between both ends of the resistor.

3. The switching regulator according to claim 1, further comprising:
   a clamp detector configured to detect a clamp operation of the clamper and output the clamp detection signal to the PFM detector, wherein
   the PFM detector determines the clamp operation of the clamper with the clamp detection signal.

4. The switching regulator according to claim 3, further comprising:
   a resistor between an output from the error amplifier and the phase compensation portion, wherein
   the PFM detector detects a polarity of the error current by a voltage between both ends of the resistor.

* * * * *